United States Patent [19]

Gaines et al.

[11] 3,744,660
[45] July 10, 1973

[54] SHIELD FOR NUCLEAR REACTOR VESSEL

[75] Inventors: Albert L. Gaines, West Simsbury; Gennaro V. Notari, Simsbury, both of Conn.

[73] Assignee: Combustion Engineering, Inc., Windsor, Conn.

[22] Filed: Dec. 30, 1970

[21] Appl. No.: 102,800

[52] U.S. Cl. .................. 220/10, 176/87, 220/5 A
[51] Int. Cl. .............................................. B65d 7/22
[58] Field of Search .................. 220/3, 71, 83, 5, 220/10, 5 A, 12; 23/296; 176/38, 87

[56] References Cited
UNITED STATES PATENTS

| | | | |
|---|---|---|---|
| 3,282,459 | 11/1966 | Wilson | 220/10 X |
| 3,578,564 | 10/1968 | Fletcher | 220/10 X |
| 3,256,069 | 6/1966 | Peterson | 220/3 X |
| 3,587,905 | 6/1971 | McFarland | 220/3 |
| 2,360,391 | 10/1944 | Birchall | 220/3 |

Primary Examiner—Leonard Summer
Assistant Examiner—James R. Garrett
Attorney—Carlton F. Bryant, Stephen A. Schneeberger, Eldon H. Luther, Robert L. Olson, John F. Carney, Richard H. Berneike, Edward L. Kochey, Jr. and Lawrence P. Kessler

[57] ABSTRACT

A protective shield for a nuclear reactor vessel is disclosed that is operative to reduce the impact strength of high pressure fluid released as a result of a reactor accident and also to prevent the expulsion of high velocity fragments from the vessel. The shield is constructed of a plurality of independent cylindrical rings that are axialy secured by tie rods. The tie rods are adapted to expand in the event of an inordinate buildup of pressure behind the shield whereby the rings can be displaced to create narrow openings through which the fluid can be released at a reduced rate.

8 Claims, 3 Drawing Figures

INVENTORS
ALBERT L. GAINES
GENNARO V. NOTARI
BY
John F. Carney
ATTORNEY

SHIELD FOR NUCLEAR REACTOR VESSEL

BACKGROUND OF THE INVENTION

In the operation of a conventional nuclear power plant heat is transferred from the reactivate fuel to a vaporizable fluid which operates as the working medium in a tube-generator set. The fuel and control elements are contained in a reactor core that is enclosed by a containment vessel and through which a coolant fluid is passed in heat exchange relation with the fuel elements to extract heat therefrom. In systems of the pressurized water type the coolant fluid is maintained entirely in its liquid phase at high pressures, fluid pressures of 2,500 psi being not uncommon, with the generated heat being subsequently passed to a vaporizable fluid in an independent heat exchanger and the resulting vapor employed as the turbine working medium. In boiling water reactor systems the reactor coolant is maintained at a reduced, yet still high, pressure of about 1,000 psi, being vaporized within the reactor and the vapor passed to the tube-generator set, thereby eliminating the need for independent heat exchangers.

The extreme fluid pressures encountered in such systems give rise to the danger of releasing a large quantity of fluid with a tremendous force in the unlikely event of a failure or rupture of the containment vessel. The forces generated by the rapid expansion of the fluid contained within the vessel following fracture of the vessel would not only be sufficient to propel any vessel fragments about the environment of the plant as high velocity missiles but could also fracture the fuel elements and their retention structure to likewise propel them externally of the containment structure. With the fuel elements removed from the containment vessel the effectiveness of emergency cooling of the elements is reduced or completely lost and the danger of radioactive material emmision to the plant environment is created.

It is to the amelioration of the above-cited problem that the present invention is directed.

SUMMARY OF THE INVENTION

The present invention contemplates providing a protective shield about a nuclear reactor pressure vessel that will minimize the consequences of a serious reactor accident. The shield substantially completely encloses the vessel thereby to provide an obstruction against the propulsion of high velocity missiles resulting from the rapid expansion of the high pressure fluid liberated by rupture or fracture of the containment structure. It is formed of a plurality of stacked cylindrical rings that are axially secured in edge-to-edge relation by means of tie-rods. The tie-rods are free to expand upon the buildup of fluid pressure behind the shield as would occur upon rupture of the vessel. In expanding, the tie-rods relieve the axial securing force on the rings such that they can undergo axial movement to create annular spaces therebetween. The spaces so-created enable the contained fluid to be vented externally of the shield and at a reduced rate that is incapable of producing harmful effects referred to above.

For a better understanding of the invention, its operating advantages and the specific objects obtained by its use, reference should be made to the accompanying drawings and description which relate to a particular embodiment of the invention.

DESCRIPTION OF THE PREFERRED EMBODIMENT

Figure 1:
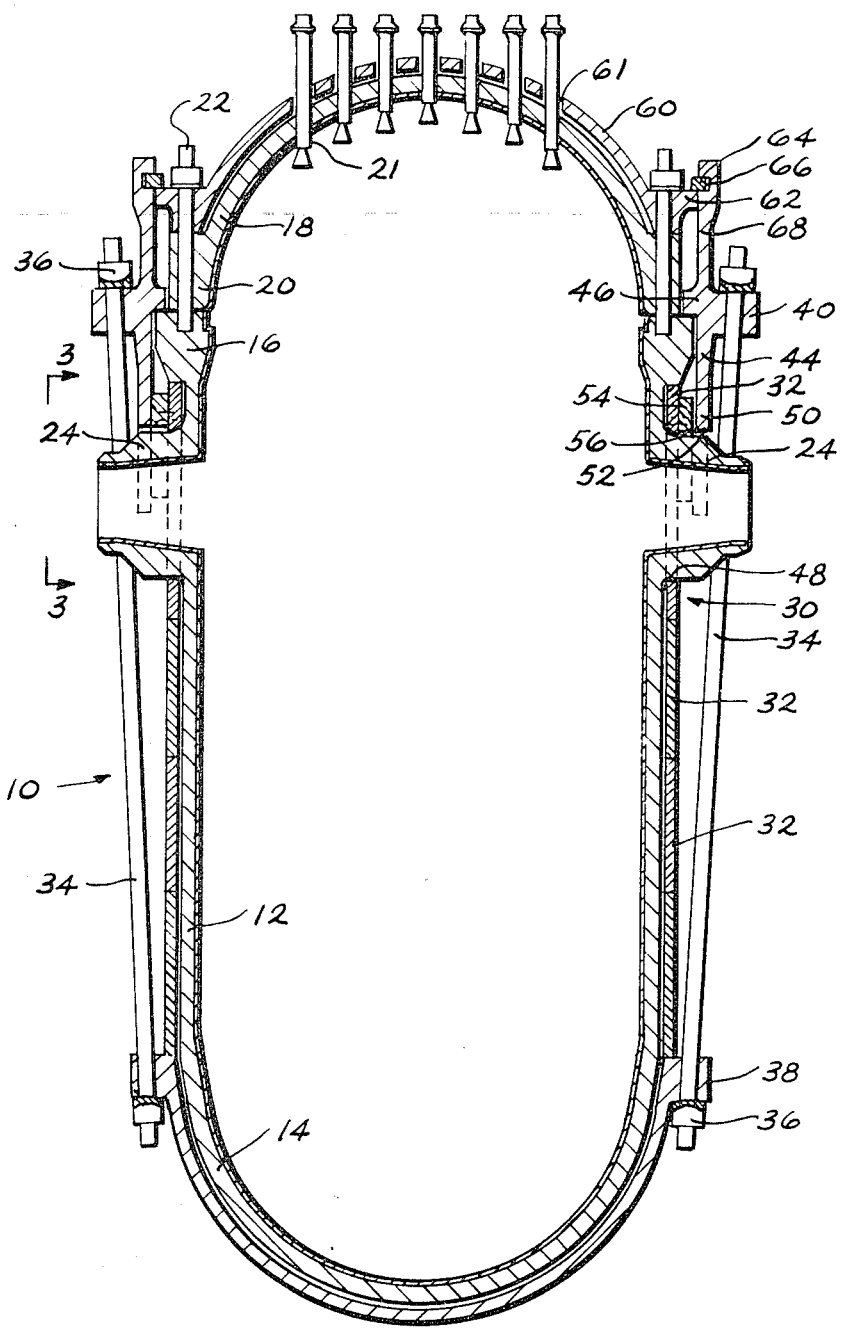
FIG. 1 is an elevational section of a nuclear reactor pressure vessel embodying the protective shield of the present invention.
Figure 2:
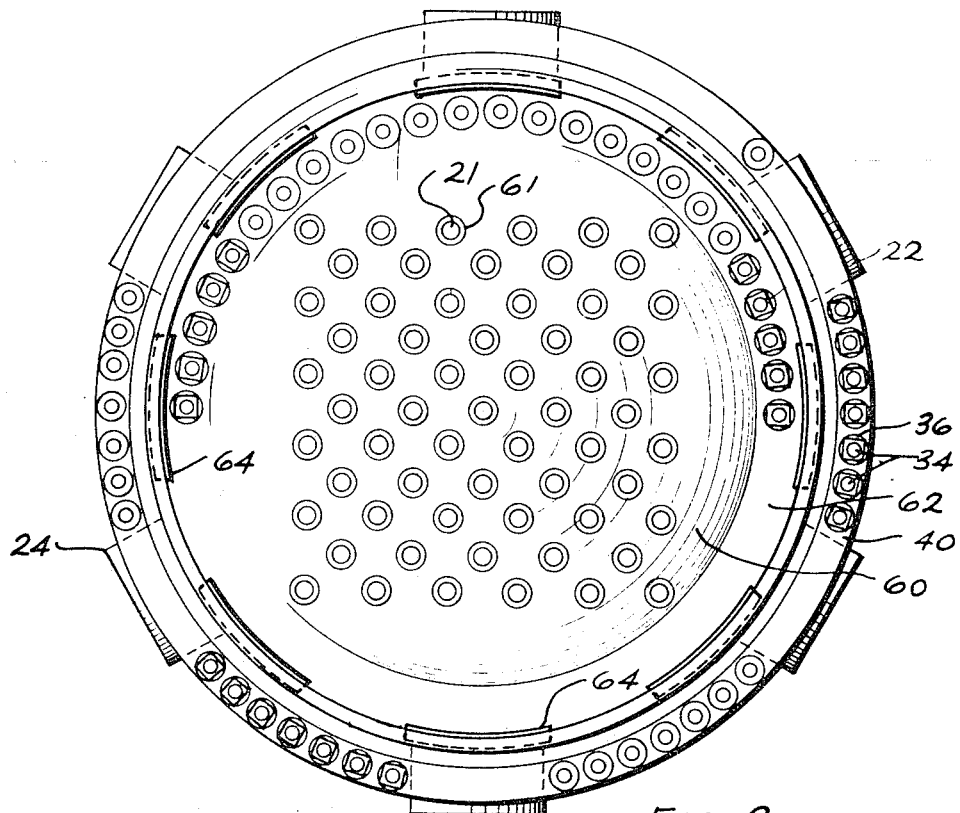
FIG. 2 is a plan view of the apparatus illustrated in FIG. 1.
Figure 3:
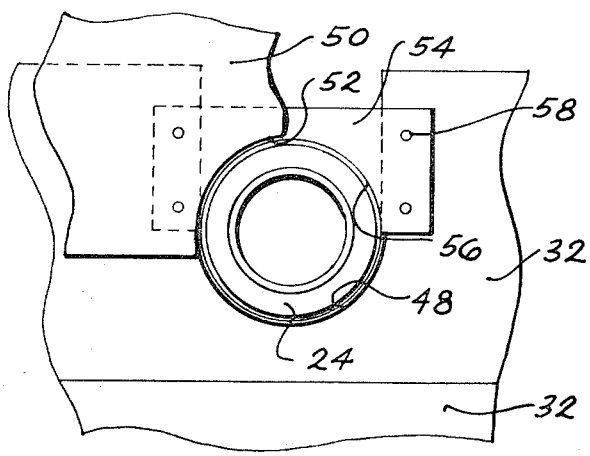
FIG. 3 is a partial elevational view taken along line 3—3 of FIG. 1.

Referring to FIG. 1 of the drawings there is illustrated one form of a nuclear reactor vessel arrangement 10 constructed according to the present invention. It comprises a generally cylindrical pressure shield 12 whose lower end is closed by a spherical closure 14 and whose upper end is provided with an annular, radially extending flange 16 for mounting a removable vessel closure cover 18, the latter being provided with a mating flange 20. An array of openings is provided in the closure cover 18 to accommodate passage of sleeves 21 which receive the manipulating rods of control elements (not shown) that operate within the reactor core. Attachment of the cover 18 to the vessel 12 is achieved by means of threaded studs 22 that are circumferentially spaced about the flanges. The interior of the pressure vessel is adapted to contain the reactor core, fuel elements, core support structure and various other associated equipment, none of which is shown for the reason that it is not germain to the present invention. A plurality of nozzles 24 are disposed in spaced relation about the circumference of the vessel 12 and provide means for circulating high pressure fluid to and from the interior thereof.

According to the invention a protective shield, indicated generally as 30, is provided to enclose the reactor vessel 10. The shield 30 operates to suppress emissions released from the reactor vessel in the event of a serious accident. Due to the unique ability to retard the rate of expansion of the high pressure fluid released from the interior of the vessel, it is effective to reduce the impact potential of the forces generated by such expansion. Additionally, the shield serves to contain vessel fragments that might otherwise be expelled from the organization as high velocity missiles under the impulse of the rapid expansion of the released fluid.

The shield 30 comprises a plurality of annular, relatively thin walled, cylindrical rings 32 that, in this embodiment, are constructed of formed metal plate. The rings 32 are vertically stacked and enclose the vessel shell 12 from a level adjacent the upper edge of the lower end closure 14 to the lower surface of the shell flange 16. Vertically extending tie-rods 34 maintain the rings 32 in stacked relation. The tie-rods are threaded at their opposite ends and secured by the nuts 36 to oppositely facing lower and upper flanges, 38 and 40 respectively. Lower flange 38 forms an integral part of a generally hemispherical lower end cover 42 that encloses the end closure 14 of the shell 12. Upper flange 40 forms part of an annular locking collar 44 that encircles the organization adjacent the junction of the mating flanges 16 and 20 on the shell 12 and its closure cover 18 respectively. The locking collar 44 is vertically supported by an annular shoulder 46 that extends radially from the inner surface of the collar and bears upon the upper surface of the upper shell flange 16.

To accommodate radial passage of the nozzles 24 the adjacent ring 32 is provided about its upper edge with a plurality of circumferentially spaced U-shaped recesses 48 that are formed to receive the undersurfaces of the respective nozzles. The upper, open portions of the recesses 48 are closed by a depending annular skirt 50 that is formed integral with the locking collar 44 extending downwardly from the flange 40 to about the horizontal centerline of the nozzles 24. Inverted U-shaped recesses 52 in the lower edge of the skirt 50 conform to the upper surfaces of the nozzles. The radial space between the skirt 50 and the adjacent ring 32 if filled by a spacer plate 54 formed on its lower edge with a recess 56 similar to that formed in the skirt. The spacer plates 54 are threadedly attached to the ring 32 by means of fasteners 58 whose heads are recessed in the plate.

The closure cover 18 of the vessel organization is enclosed by a dome shaped cover 60 that forms the upper part of the protective shield 30. The cover 60 is provided with openings 61 to accommodate passage of the control rod sleeves 21 and an annular flange 62 that serves to receive the circumferentially spaced studs 22 that attach it to the vessel flanges 16 and 20 in mutual engagement. The cover 60 is additionally secured by a plurality of rectangular shear blocks 64 that engage the flange 62 and an annular recess 66 provided in an upwardly extending portion 68 of the locking collar 44 at circumferentially spaced points about their periphery of the flange 62.

In the protective shield organization 30 illustrated herein the rings 32 and the forgings that form the lower end cover 42 and the upper dome cover 60 are shown as being sized to be in slightly spaced relation from the external surface of the enclosed pressure vessel members. By fabricating the shield components slightly oversized their assembly about the vessel is facilitated in that dimensional inaccuracies of the vessel members can be obviated. It should be understood, however, that the shield components can be formed so as to be contiguous with the enclosed members of the vessel without departing from the scope of the invention.

In assembling the protective shield structure about the vessel the nuts 36 that attach the ends of the tie-rods 34 to the opposed flanges 38 and 40 are tightened to prestress the tie-rods ideally to about 40,000 psi. Prestressing the tie-rods in this way places the contiguous edges of the respective rings 32 in compression during normal operation of the reactor such that they form a relatively tight-enclosure thereabout. In the event of a serious accident in which the reactor vessel might fracture or rupture to release its high pressure fluid contents there will be a buildup of pressure behind the shield structure. The rings 32 and forgings 42 and 60 that comprise the shield 30 are sufficiently strong to resist the hoop-tension stresses imposed upon them so as to prevent any radial blowout of the members and to contain any high velocity vessel fragments that might otherwise be expelled to the exterior. The tie-rods 34, however, will be caused to undergo a slight amount of axial expansion under the action of the forces generated by the high pressure fluid. Expansion of the tie-rods relieves the compressive loading on the rings 32 such that they can be axially displaced thereby creating annular spaces between the respective rings. It is anticipated that a serious reactor accident of the type involved would result in fluid pressures of about 2,250 psi being established behind the protective shield elements. Pressures of this magnitude will generate axial forces on the tie-rods 34 causing them to expand axially about one inch thereby permitting the rings to be axially displaced to create spaces therebetween averaging about one-quarter inch in width. The high pressure fluid will thus be released to the exterior of the shield through the spaces formed between the rings. Because the fluid is released through the narrow spaces formed between the rings, the rate of its expansion will be retarded thus operating to eliminate or minimize the danger of its creating high impact forces capable of causing serious damage to the containment structure of the plant or to its surroundings as could otherwise be created were the fluid uncontained and thereby free to expand rapidly.

It will be understood that various changes in the details, materials, and arrangements of parts which have been herein described and illustrated in order to explain the nature of the invention, may be made by those skilled in the art within the principle and scope of the invention as expressed in the appended claims.

What is claimed is:

1. In combination, a generally cylindrical pressure vessel for containing a fluid under pressure and having a wall thickness to provide sufficient structural strength to withstand the highest expected pressure of said fluid and a protective shield enclosing said vessel, said shield comprising:
   a. a plurality of cylindrical members concentrically disposed with respect to said vessel in stacked end-to-end relation and in radially spaced relation to said vessel.
   b. longitudinally extending tie means for imparting a compressive loading upon said cylindrical members and disposing them in mutually contiguous relation when said pressure vessel is intact,
   c. said cylindrical members and said tie means being free from exposure to stresses imposed by the fluid contained in said vessel when the same is intact, and
   d. said tie means being of insufficient structural strength to withstand the pressure of the fluid within said vessel and being expandable in a direction parallel to the axis of said cylindrical members upon rupture of said pressure vessel in an amount to provide spaces between said cylindrical members for the release of liberated fluid.

2. The combination recited in claim 1 wherein said cylindrical members comprise discrete members defining a generally cylindrical body enclosing said vessel at least along a substantial portion of its axis.

3. The combination as recited in claim 2 wherein said cylindrical members are formed of hollow, open cylinders having a wall thickness less than that of said pressure vessel.

4. The combination as recited in claim 2 including a pair of axially spaced members concentrically disposed about said vessel adjacent the opposite ends thereof, said members bearing annular flanges attaching the ends of said tie means, at least one of said members engaging said rings for imparting a compressive load thereon upon tensioning said tie means.

5. The combination as recited in claim 4 wherein said tie means comprise a plurality of tie rods circumferentially spaced about said flanges.

6. The combination as recited in claim 5 wherein one of said flange-bearing members is a dome shaped cover enclosing the lower end of said vessel and including an upper surface engaging the lowermost ring member.

7. The combination as recited in claim 6 wherein said pressure vessel includes an annular flange integrally formed adjacent the upper end thereof, said flange compressively engaging the uppermost cylindrical member.

8. The combination as recited in claim 7 wherein one of said flange bearing members is a generally cylindrical locking collar compressively engaging said pressure vessel flange, a dome shaped closure cover enclosing the upper end of said pressure vessel, and shear block means cooperating with said locking collar for securing said closure cover in assembled relation with said pressure vessel.

* * * * *